(No Model.)
J. M. EWEN.
PROCESS OF DUPLICATING ARCHITECTURAL AND SIMILAR DRAWINGS.
No. 390,577. Patented Oct. 2, 1888.
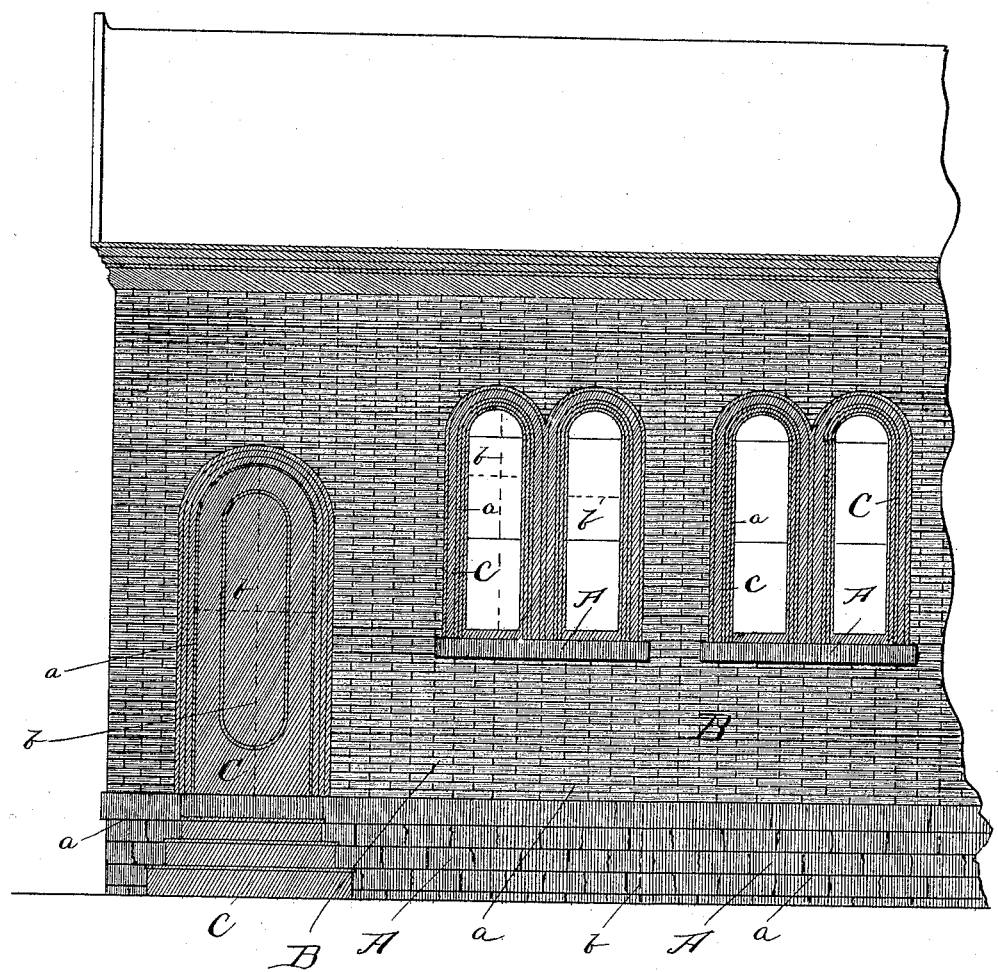

UNITED STATES PATENT OFFICE.

JOHN M. EWEN, OF EVANSTON, ILLINOIS.

PROCESS OF DUPLICATING ARCHITECTURAL AND SIMILAR DRAWINGS.

SPECIFICATION forming part of Letters Patent No. 390,577, dated October 2, 1888.

Application filed August 6, 1887. Serial No. 246,256. (No specimens.)

*To all whom it may concern:*

Be it known that I, JOHN M. EWEN, a citizen of the United States, residing in Evanston, in the county of Cook and State of Illinois, have invented a new and useful Improvement in Process of Duplicating Architectural and Similar Drawings, of which the following is a specification.

My invention has for its object the quick and easy reproduction or duplication of architectural and other drawings made in colors.

In practicing the invention I make the outlines or lined part of the drawing—such as are usually made with the pen—by the use of the hectograph-inks of commerce, or other ink which will adhere in the same manner to a gelatine surface when impressed thereon, and print from such surface, preferring for this purpose some dark color, such as violet. The ink which I employ for the lines possesses body to a greater extent than the coloring-inks hereinafter mentioned. When the drawing has thus been lined, I proceed to color the different outlined parts thereof in various colors, using any of the conventional colors of inks employed to indicate different building materials—as, for instance, red to indicate brick, blue for stone, yellow for wood, &c.—by brushing or applying said inks over the parts to be colored in either a flat tint or shaded wash. The coloring-inks must also be capable of adhering to and printing from a gelatine surface, and must be thinner and lighter than the inks used for the lines, so the latter may not be too much obscured, nor so completely covered as to prevent their adhering to the film and printing with the coloring-inks. Of course, also, the coloring-inks should not act to spread or blur the line-inks.

I have found coloring-inks made according to a formula originated by myself to answer exceedingly well. This formula is as follows: Take one-half pint of alcohol and put in one dram of aniline-dye of the color desired, and let the mixture stand until the dye is wholly dissolved. Then add one-half ounce of glycerine, and stir so the latter may be thoroughly diffused.

Of course I do not wish to be limited to inks made according to this particular formula, although I have not found any other to answer the purpose.

When the drawing has been duly colored with these inks, it is pressed upon a gelatine slab, which absorbs and retains the various line and coloring inks, and the prints are then taken from the gelatine in the same manner as ordinary dry printing is done by the use of the hectograph. In prints thus made all the colors and lines of the original are reproduced, the lines being well defined, and the ruled lines, even when covered by the coloring-inks, being as distinct, or nearly so, as in the original. It is but a few minutes' work in this manner to produce forty or more completely-colored copies of an architectural drawing, and almost no expense for labor is required beyond that involved in making the original drawing. The effect of a water-colored drawing may be thus obtained in a large number of duplicate copies, each of which is printed by a single impression.

For a more complete understanding of the invention, I refer to the accompanying drawing, wherein is given a partial elevation of a building. In the original of this drawing the ruled lines *a a* are made with a dark hectograph-ink of commerce, as stated, and the parts A, B, and C are variously colored with the conventional colors used by architects to denote different building materials, or otherwise, according to fancy, by the application of the coloring-inks of less body, as described. The broken lines *b* may represent dimension-lines, and may be made with a different colored ink from that used with the lines *a a*. In the reproduction of this original drawing, by the aid of the gelatine film, every feature thereof is duplicated, including all the colors, the shading, and the covered ruled lines.

I claim—

An improvement in the reproduction, by dry printing, of architectural and other drawings, consisting in preparing the original drawing which is to be reproduced by the use of the hectograph or like inks for the rule-lines, and coloring-inks having less body than the line-inks, applied in flat wash or shaded tint over the ruled lines, all said inks being adapted to adhere to a gelatine film, substantially as set forth.

JOHN M. EWEN.

Witnesses:
H. M. MUNDAY,
EDW. S. EVARTS.